(12) United States Patent
Xu et al.

(10) Patent No.: US 11,403,782 B2
(45) Date of Patent: Aug. 2, 2022

(54) STATIC CHANNEL FILTERING IN FREQUENCY DOMAIN

(71) Applicant: Alibaba Group Holding Limited, Grand Cayman (KY)

(72) Inventors: Kai Xu, Hangzhou (CN); Fei Sun, San Jose (CA); Minghai Qin, Sunnyvale (CA); Yen-kuang Chen, Palo Alto (CA)

(73) Assignee: Alibaba Group Holding Limited, George Town (KY)

( * ) Notice: Subject to any disclaimer, the term of this patent is extended or adjusted under 35 U.S.C. 154(b) by 218 days.

(21) Appl. No.: 16/731,388

(22) Filed: Dec. 31, 2019

(65) Prior Publication Data

US 2021/0201538 A1 Jul. 1, 2021

(51) Int. Cl.
*G06K 9/36* (2006.01)
*G06T 9/00* (2006.01)
(Continued)

(52) U.S. Cl.
CPC .............. *G06T 9/00* (2013.01); *G06N 20/00* (2019.01); *G06T 3/4084* (2013.01); *G06T 5/10* (2013.01);
(Continued)

(58) Field of Classification Search
CPC ....... H04N 19/00278; H04N 19/00951; H04N 7/26; H04N 19/00587; H04N 19/0063; H04N 5/23251; H04N 19/136; H04N 19/124; H04N 19/625; H04N 19/176; H04N 19/186; H04N 19/18; H04N 19/80; H04N 19/117; H04N 19/48; G06K 9/36; G06T 3/602; G06T 9/00; G06T 9/20;
(Continued)

(56) References Cited

U.S. PATENT DOCUMENTS

2006/0023259 A1 2/2006 Wark et al.
2006/0251330 A1* 11/2006 Toth ....................... H04N 19/96
382/236

(Continued)

OTHER PUBLICATIONS

PCT Search Report and Written Opinion dated Mar. 9, 2021 for PCT Application No. PCT/US20/65343, 14 pages.

*Primary Examiner* — Duy M Dang
(74) *Attorney, Agent, or Firm* — Lee & Hayes, P.C.

(57) ABSTRACT

Methods and systems are provided for implementing static channel filtering operations upon image datasets transformed to frequency domain representations, including decoding images of an image dataset to generate a frequency domain representation of the image dataset; discarding coefficient values of one or more particular frequency channels of each image of the image dataset in a frequency domain representation; and transporting the image dataset in a frequency domain representation to one or more special-purpose processor(s). Methods and systems of the present disclosure may enable a filtered image dataset to be input to a second layer of a learning model, bypassing a first layer, or may enable a learning model to be designed with a reduced-size first layer. This may achieve benefits such as reducing computational overhead and time of machine learning training and inference computations, reducing volume of image data input into the learning model, and reducing convergence time.

20 Claims, 11 Drawing Sheets

(51) Int. Cl.
  *G06T 3/40*     (2006.01)
  *G06T 5/10*     (2006.01)
  *G06T 11/60*    (2006.01)
  *H04N 19/625*   (2014.01)
  *H04N 19/176*   (2014.01)
  *G06N 20/00*    (2019.01)
  *H04N 19/186*   (2014.01)

(52) U.S. Cl.
  CPC ........... *G06T 11/60* (2013.01); *H04N 19/176* (2014.11); *H04N 19/186* (2014.11); *H04N 19/625* (2014.11); *G06T 2207/20052* (2013.01); *G06T 2207/20081* (2013.01); *G06T 2210/22* (2013.01)

(58) Field of Classification Search
  CPC .... G06T 7/50; G06T 7/13; G06T 7/80; G06T 7/0002; G01N 29/0645; G01N 29/0681; G01N 29/46; G01S 7/52053; G06N 20/00
  See application file for complete search history.

(56) References Cited

U.S. PATENT DOCUMENTS

| | | | |
|---|---|---|---|
| 2010/0329579 A1* | 12/2010 | Patera | H04N 19/86 382/233 |
| 2016/0292589 A1* | 10/2016 | Taylor, Jr. | G06F 16/1744 |
| 2018/0084284 A1 | 3/2018 | Rosewarne et al. | |
| 2019/0042870 A1 | 2/2019 | Chen | |
| 2019/0098283 A1 | 3/2019 | Filippov | |

* cited by examiner

FIG. 3A

| 17 | 3  | 6 | 0 | 0 | 0 | 0 | 0 |
|----|----|---|---|---|---|---|---|
| 9  | 28 | 5 | 0 | 0 | 0 | 0 | 0 |
| 7  | 1  | 0 | 0 | 0 | 0 | 0 | 0 |
| 0  | 0  | 0 | 0 | 0 | 0 | 0 | 0 |
| 0  | 0  | 0 | 0 | 0 | 0 | 0 | 0 |
| 0  | 0  | 0 | 0 | 0 | 0 | 0 | 0 |
| 0  | 0  | 0 | 0 | 0 | 0 | 0 | 0 |
| 0  | 0  | 0 | 0 | 0 | 0 | 0 | 0 |

FIG. 3B

| 0 | 0 | 0 | 0 | 0 | 0 | 0 | 0  |
|---|---|---|---|---|---|---|----|
| 0 | 0 | 0 | 0 | 0 | 0 | 0 | 0  |
| 0 | 0 | 0 | 0 | 0 | 0 | 0 | 0  |
| 0 | 0 | 0 | 0 | 0 | 0 | 0 | 0  |
| 0 | 0 | 0 | 0 | 0 | 0 | 0 | 0  |
| 0 | 0 | 0 | 0 | 0 | 0 | 4 | 10 |
| 0 | 0 | 0 | 0 | 0 | 6 | 3 | 6  |
| 0 | 0 | 0 | 0 | 0 | 1 | 1 | 2  |

FIG. 3C

| 0 | 0  | 36 | 0 | 0 | 0 | 0 | 0 |
|---|----|----|---|---|---|---|---|
| 0 | 0  | 0  | 0 | 0 | 2 | 0 | 0 |
| 0 | 27 | 0  | 0 | 0 | 0 | 1 | 0 |
| 0 | 0  | 0  | 0 | 7 | 0 | 0 | 0 |
| 0 | 0  | 19 | 0 | 0 | 0 | 0 | 0 |
| 0 | 0  | 0  | 0 | 0 | 5 | 0 | 0 |
| 0 | 3  | 0  | 0 | 0 | 0 | 0 | 0 |
| 0 | 0  | 0  | 0 | 0 | 0 | 0 | 0 |

STATIC CHANNEL FILTERING IN FREQUENCY DOMAIN

BACKGROUND

Many forms of information, such as audio and images, may be transformed into various representations thereof in the frequency domain, then transformed back to their original representation by an inverse transformation. A frequency domain representation of information has numerous applications in data processing. For example, image encoding algorithms generally compress image data by transforming image data into a frequency domain representation, as reduction of image data size can be readily accomplished by algorithms operating on frequency domain data.

Image data represented in the spatial domain may be represented in a variety of color spaces, including, commonly, the RGB color space and the YCbCr color space. In RGB color space, image data is separated into the red, green, and blue color components; in YCbCr color space, image data is separated into a luma component and two chroma components. Digital image data may readily be represented in either of these color spaces; for example, the commonly adopted MPEG encoder for video utilizes YCbCr. Furthermore, the similarly commonly adopted JPEG encoder for images utilizes YCbCr, as an intermediate step in converting image data from a spatial domain representation in RGB to a frequency domain representation by applying a discrete cosine transform ("DCT").

In machine learning settings utilizing image-based learning models, training and inference datasets may be ready-made datasets of compressed images, but may alternatively be raw, uncompressed images captured by an image capture device such as a camera. In a system implemented for machine learning computation on massive datasets, computational resources may be distributed over a network in, for example, a cloud computing system to maximize power and availability. As uncompressed images are untenable for transportation over a network and training and inference computation, machine learning systems configured in this manner also rely on transformation and inverse transformation of images into and out of the frequency domain in order to compress image datasets for optimal transport, storage, and computation.

The transformation of image datasets into the frequency domain in the machine learning context is generally helpful in determining contextual information such as relative importance of image data, by the application of principles derived from, for example, frequency-based filtering. However, presently, no pipeline exists between coding of representations of images in the frequency domain and derivation of representations of images in the frequency domain for training and inference computations. Greater computational efficiency may be realized by leveraging image coding in the frequency domain for further applications in machine learning.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

FIGS. 3A, 3B, and 3C illustrate static channel filtering performed on a DCT block according to example embodiments of the present disclosure.

FIGS. 3D, 3E, and 3F illustrate examples of static channel filtering discarding all but the lowest-frequency channels of one each of Y, Cb, and Cr DCT blocks and further applying weights to channels wherein image data is kept.

DETAILED DESCRIPTION

Figure 1A:
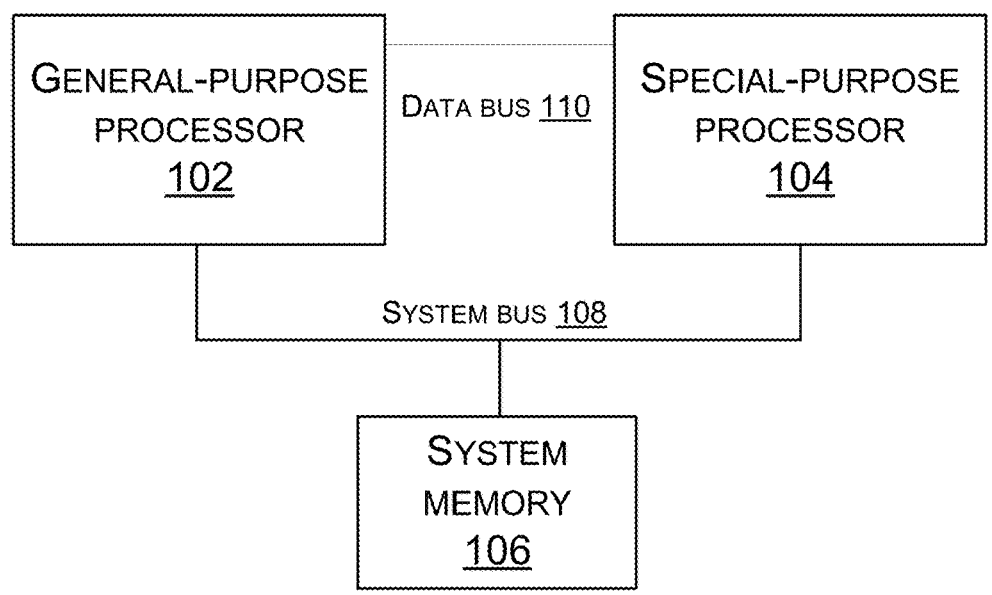
FIG. 1A illustrates a system architecture of a system configured to perform training and inference computations according to example embodiments of the present disclosure.

Systems and methods discussed herein are directed to implementing data filtering for learning models, and more specifically performing static channel filtering on image datasets represented in the frequency domain for model training and inference computations.

A learning model, according to example embodiments of the present disclosure, may be a defined computation algorithm executable by one or more processors of a computing system to perform tasks that include processing input having various parameters and outputting results. A learning model may be, for example, a layered model such as a deep neural network, which may have a fully-connected structure, may have a feedforward structure such as a convolutional neural network ("CNN"), may have a backpropagation structure such as a recurrent neural network ("RNN"), or may have other architectures suited to the computation of particular tasks. Tasks may include, for example, classification, clustering, matching, regression, and the like.

Tasks may provide output for the performance of functions such as recognizing entities in images and/or video; tracking movement of entities in video frames in real-time; matching recognized entities in images and/or video to other images and/or video; providing annotations or transcriptions of images, video, and/or audio in real-time; and the like.

Cloud computing systems may provide collections of servers hosting computing resources to provide distributed computing, parallel computing, improved availability of physical or virtual computing resources, and such benefits. Data centers implemented in cloud computing systems may host learning models to provide these benefits for the application of computing using learning models.

A cloud computing system may connect to various end devices which collect data to be input into learning models to train the learning models and/or in association with various tasks for the computation and output of results required for the performance of those tasks. End devices may connect to the cloud computing system through edge nodes of the cloud computing system. An edge node may be any server providing an outbound connection from connections to other nodes of the cloud computing system, and thus may demarcate a logical edge, and not necessarily a physical edge, of a network of the cloud computing system. Moreover, an edge node may be edge-based logical nodes that deploy non-centralized computing resources of the cloud computing system, such as cloudlets, fog nodes, and the like.

End devices may be responsible for multiple types of task involving multiple types of input data. For example, an end device may be a security camera which collects still images, video, and other types of data, connects to an edge node of a cloud computing system which performs real-time security monitoring of locations being surveilled by such security cameras, and sends each of these types of data in real-time to the cloud computing system to perform various tasks related to real-time security monitoring. According to another example, an end device may be a smart vehicle in motion which collects still images, video, and other types of data during motion, connects to roadside networking infrastructure which serves as an edge node of a cloud computing system which performs real-time traffic monitoring of smart vehicles, and sends each of these types of data in real-time to the cloud computing system to perform various tasks related to real-time traffic monitoring.

These different types of input may each require computing by learning models. Due to the very large file sizes of image datasets used in deep learning, loading and computation of image datasets may incur substantial computational overhead.

In an IoT network connected to a cloud computing system, massive numbers of tasks and collections of data associated therewith may be delivered from edge devices to the cloud computing system for processing. Edge devices of the IoT network may be geographically remote from the computational resources of the cloud computing system, resulting in network latency in the transportation of tasks and associated data. The relatively lower computing resource specifications of edge devices compared to the cloud computing system, including processing power, storage, and memory, also results in a relative disparity in computational capacity therebetween. Various architectural designs may be implemented over the learning model in order to address network latency and disparity in computational capacity so as to improve response time and efficiency in completing tasks.

For example, massive quantities of locally collected data at edge devices may result in intolerable degrees of latency if delivered to a cloud computing system for computing by a learning model executing on the cloud computing system. Moreover, images in a raw, uncompressed format are highly inefficient for machine learning computation due to containing many times more data, often superfluous for machine learning training and inference purposes, than compressed images. Consequently, it is desirable to compress images captured at image capture devices prior to the use of such images in training and inference datasets.

It is generally known to transform data into a frequency representation by a transform algorithm such as, for example, Fourier transform, and to transform image data from a spatial domain representation (i.e., image pixel data) into a frequency domain representation by Fourier-related algorithms such as discrete cosine transform ("DCT"). The inverse discrete cosine transform ("IDCT") may further operate to return a frequency domain representation of image data to a spatial domain representation. Common image compression formats such as JPEG utilize DCT to transform raw images into a frequency domain representation and discard image data selectively by frequency. DCT-based image encoders save images in a compressed format which cannot be utilized for computation until decoded into reconstructed images. However, reconstructed images remain represented in the frequency domain and must undergo IDCT to be returned to a spatial domain representation.

Presently, model training and inference are implemented assuming that image datasets are input into learning models in spatial domain representations thereof. In spatial domain representations of images, image data is represented by pixels, where, nominally, any pixel may be as significant to perception or processing of the image, whether by human viewers or by a learning model, as any other pixel. To the extent that some pixels may not contribute significantly to perception or processing of the image, those pixels' lack of significance generally cannot be determined ex ante, and may need to be determined semantically. Some learning models may semantically analyze the contents of images of an image dataset, but such analysis comes with commensurate computing cost.

Thus, rather than semantically determine the significance of image data, image data may instead be discarded in a frequency domain representation of the image dataset. Although particular frequencies of image data do not necessarily denote significance or lack of significance to image data, nevertheless particular frequencies of image data may be utilized as an approximation or a proxy for semantic determinations of image data significance.

For example, in frequency domain representations of common photographic images, the lowest-frequency channels are expected to have higher coefficient values than higher-frequency channels, and higher-frequency channels are expected to have lower coefficient values. This correlates to a general understanding that discarding coefficient values of higher-frequency channels from an image minimally impacts perception of the image by human viewers, and, accordingly, an expectation that discarding coefficient values of higher-frequency channels from the image also may minimally impact training and inference computations utilizing the image by a learning model. In accordance, lower-frequency channels from the image dataset may be emphasized.

Alternatively, based on a general understanding that edges and fine details in an image correspond to higher-frequency channels in an image, in the event that a learning model is to perform training and inference computations based on edges and fine details in image datasets, higher-frequency channels from the image dataset may be emphasized.

By these and similar principles, example embodiments of the present disclosure provide static channel filtering performed upon image datasets transformed into frequency domain representations, enabling image data of an image dataset thought to be insignificant to training and inference computing by a learning model to be discarded, facilitated by the image dataset having been transformed into a frequency domain representation, prior to incurring data transfer bottlenecks or computationally intensive computations.

FIG. 1A illustrates a system architecture of a system 100 configured to perform training and inference computations according to example embodiments of the present disclosure.

A system 100 according to example embodiments of the present disclosure may include one or more general-purpose processor(s) 102 and one or more special-purpose processor(s) 104. The general-purpose processor(s) 102 and special-purpose processor(s) 104 may be physical or may be virtualized and/or distributed. The general-purpose processor(s) 102 and special-purpose processor(s) 104 may execute one or more instructions stored on a computer-readable storage medium as described below to cause the general-purpose processor(s) 102 or special-purpose processor(s) 104 to perform a variety of functions. Special-purpose processor(s) 104 may be computing devices having hardware or software elements facilitating computation of neural network computing tasks such as training and inference computations. For example, special-purpose processor(s) 104 may be accelerator(s), such as Neural Network Processing Units ("NPUs"), Graphics Processing Units ("GPUs"), Tensor Processing Units ("TPU"), implementations using field programmable gate arrays ("FPGAs") and application specific integrated circuits ("ASICs"), and/or the like. To facilitate computation of tasks such as training and inference, special-purpose processor(s) 104 may, for example, implement engines operative to compute mathematical operations such as matrix operations and vector operations.

A system 100 may further include a system memory 106 communicatively coupled to the general-purpose processor(s) 102 and the special-purpose processor(s) 104 by a system bus 108. The system memory 106 may be physical or may be virtualized and/or distributed. Depending on the exact configuration and type of the system 100, the system memory 106 may be volatile, such as RAM, non-volatile, such as ROM, flash memory, miniature hard drive, memory card, and the like, or some combination thereof.

The system bus 108 may transport data between the general-purpose processor(s) 102 and the system memory 106, between the special-purpose processor(s) 104 and the system memory 106, and between the general-purpose processor(s) 102 and the special-purpose processor(s) 104. Furthermore, a data bus 110 may transport data between the general-purpose processor(s) 102 and the special-purpose processor(s) 104. The data bus 110 may, for example, be a Peripheral Component Interconnect Express ("PCIe") connection, a Coherent Accelerator Processor Interface ("CAPI") connection, and the like.

Figure 1B:
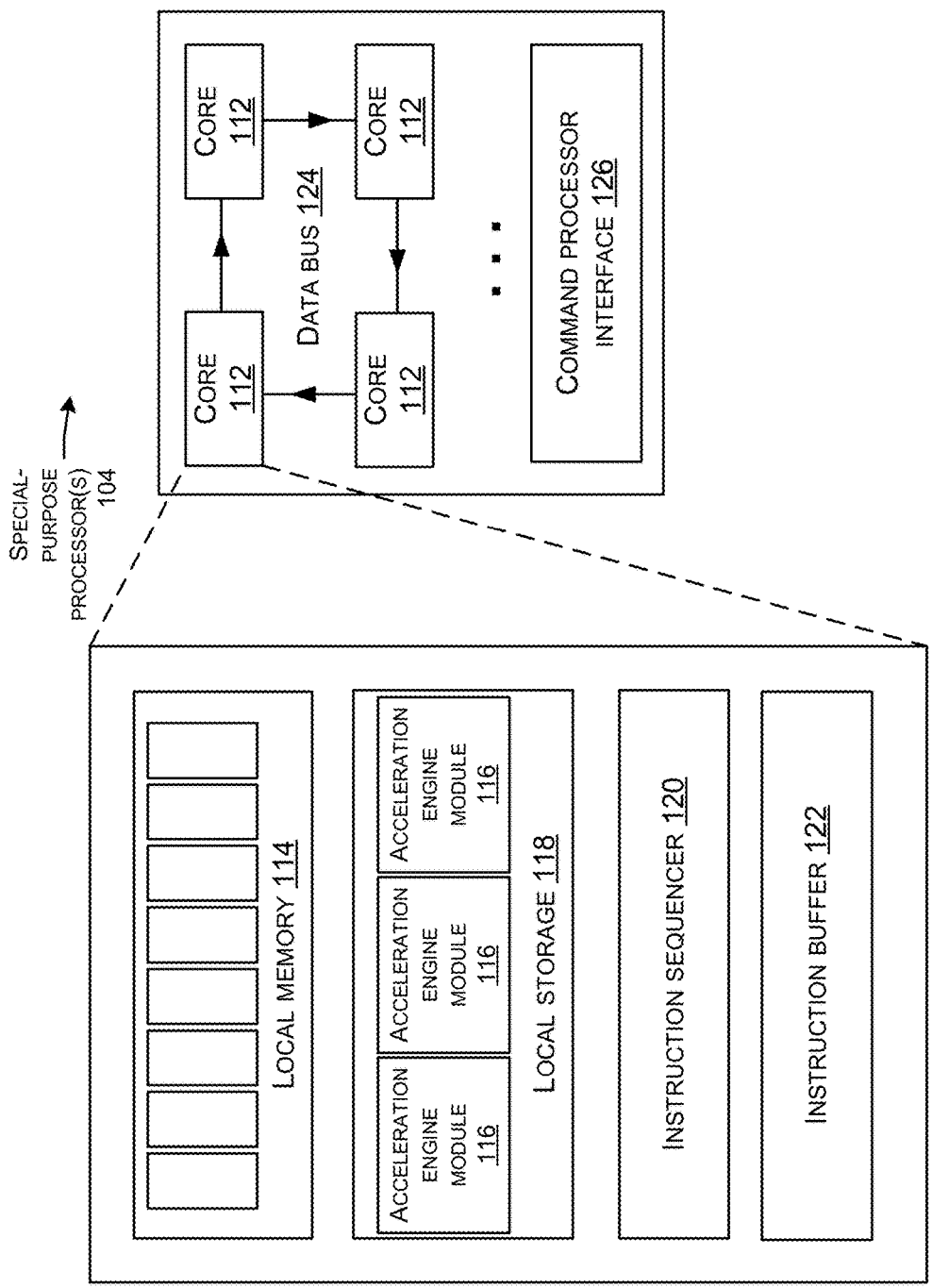
FIG. 1B illustrates a special-purpose processor according to examples of FIG. 1A.

FIG. 1B illustrates an example of special-purpose processor(s) 104, including any number of core(s) 112. Processing power of the special-purpose processor(s) 104 may be distributed among the core(s) 112. Each core 112 may include local memory 114, which may contain pre-initialized data, such as model weights, or data structures, such as constant buffers for batch normalization or quantization, for the performance of special-purpose computing. Each core 112 may further be configured to execute one or more sets of computer-executable acceleration engine modules 116 pre-initialized on local storage 118 of the core 112, which may each be executable by the core(s) 112, including execution in parallel by multiple core(s) 112, to perform or accelerate, for example, arithmetic operations such as matrix multiplication or matrix transposition, function operations such as convolution, specially defined operations such as pooling of convolutional layers, interpolation, or region-of-interest operations, data operations. Each core 112 may further include an instruction sequencer 120, which receives and orders instructions received from an instruction buffer 122. Some number of core(s) 112, such as four, may be in communication by a data bus 124, such as a unidirectional ring bus. Software drivers controlling operation of each core 112 may control the core(s) 112 and synchronize their operations by sending executable commands through a command processor interface 126.

Increasingly, special-purpose processor(s) 104 such as accelerators are designed for greater computational power and workloads. In particular, in the context of training and inference computations according to example embodiments of the present disclosure, special-purpose processor(s) 104 may, in particular, be designed for such computations using massive image datasets. Consequently, system architectures for special-purpose computation are increasingly bottlenecked by data bandwidth for a system bus 108, or a data bus 110 such as a PCIe or CAPI connection: current technologies for the system bus 108 and the data bus 110 may be unable to transport data at rates commensurate to desired rates for computation speed and output. In the absence of improvements to the system bus 108 and the data bus 110 themselves, it is desirable to alleviate this bottleneck by reducing volumes of data transported over the system bus 108 or the data bus 110.

Image datasets according to example embodiments of the present disclosure may be transported to special-purpose processor(s) 104 over a data bus 110 in various possible formats. For example, image datasets may be transported as uncompressed bitmap images represented in the spatial domain in the RGB color space. However, uncompressed images would generally require inordinate bus bandwidth for transportation to special-purpose processor(s) 104. Moreover, in order to perform training and inference computations on uncompressed images using frequency domain representations thereof, special-purpose processor(s) 104 may require a codec, and encoders and decoders implementing the codec, to be stored on dedicated memory or storage of the special-purpose processor(s) 104 and to be executed by the special-purpose processor(s) 104 during the training and inference computations, in order to derive frequency-domain representations of the uncompressed images. This would further divert computational resources from the training and inference computations.

Moreover, even if images of the image dataset were transported in a compressed format to the special-purpose processor(s) 104, the compressed images of the image dataset would still include image data of all pixels found in the corresponding uncompressed pictures. In the performance of training and inference computations involving images, generally not all image data of the images is relevant to the computations. As examples for illustrative purposes, in processing of data in frequency domain representations thereof, it is generally known to utilize high-pass or low-pass filters to decrease or remove low-frequency or high-frequency data, respectively.

Thus, example embodiments of the present disclosure propose methods to filter image data of an image dataset in the frequency domain prior to the image dataset being transported to special-purpose processor(s) for training and inference computation, thereby reducing volume of image data to be transported.

Figure 2A:
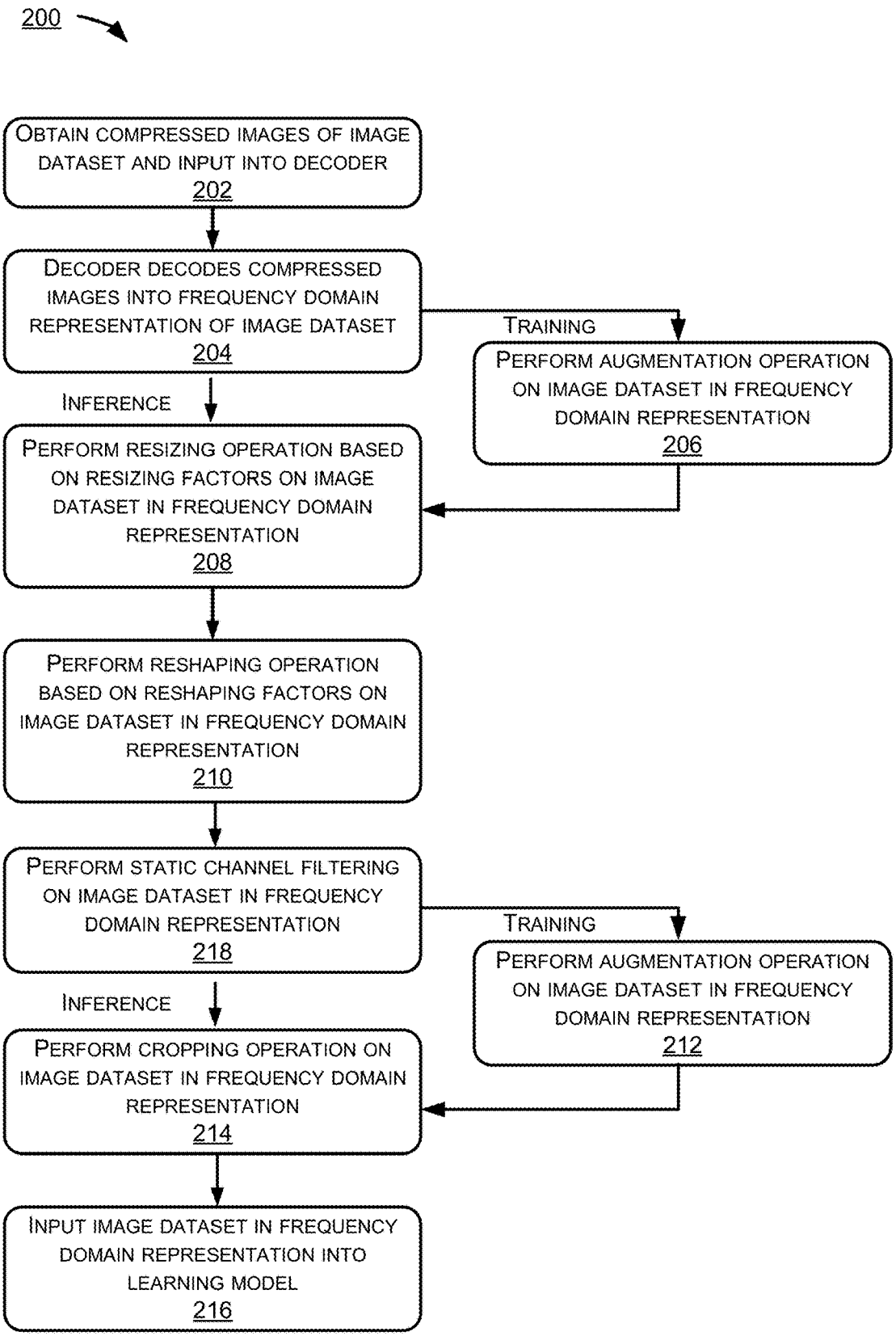
FIGS. 2A, 2B and 2C illustrate flowcharts of a preprocessing and augmentation process for image datasets to be input into a learning model for training and inference according to example embodiments of the present disclosure.
Figure 2B:
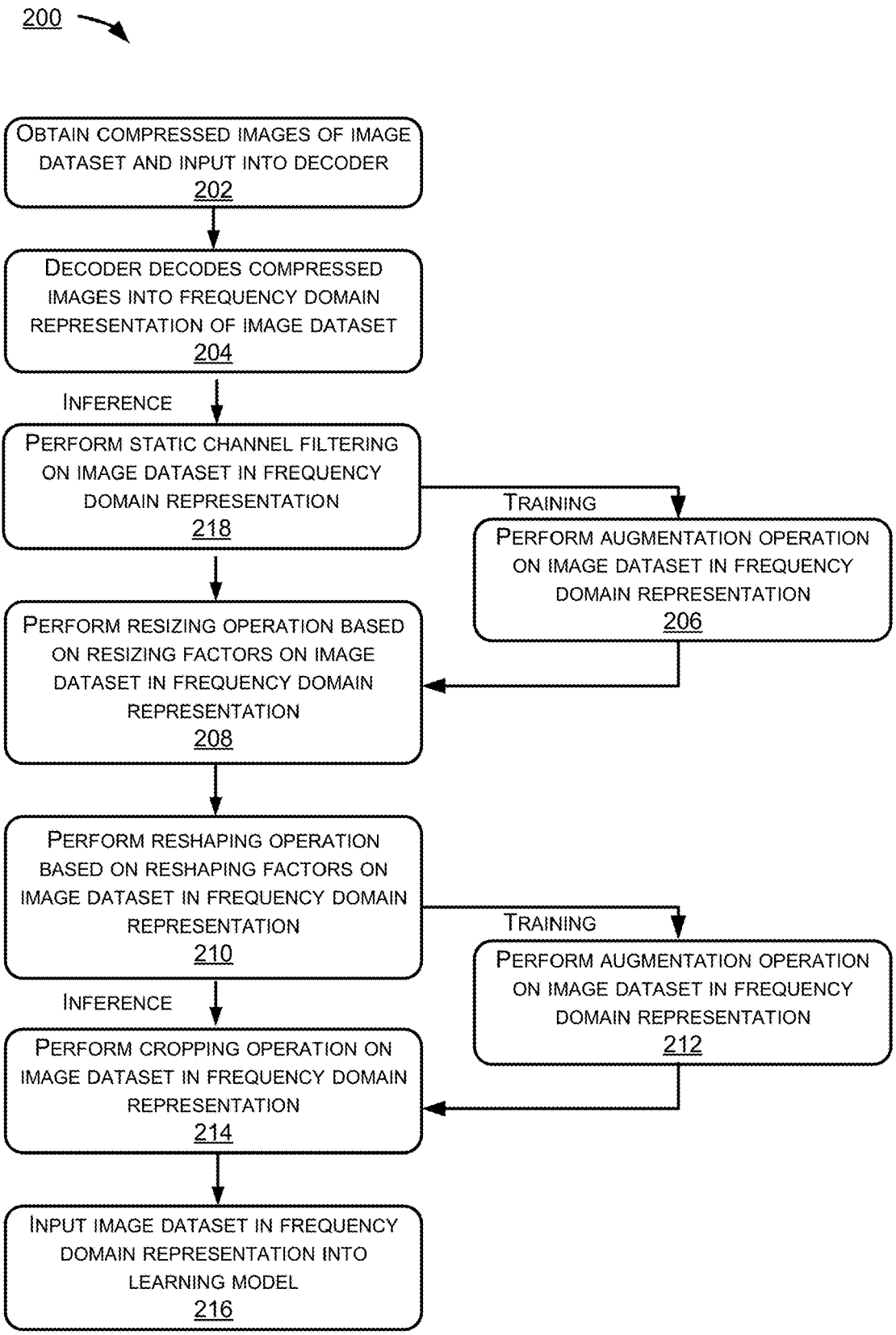
Figure 2C:
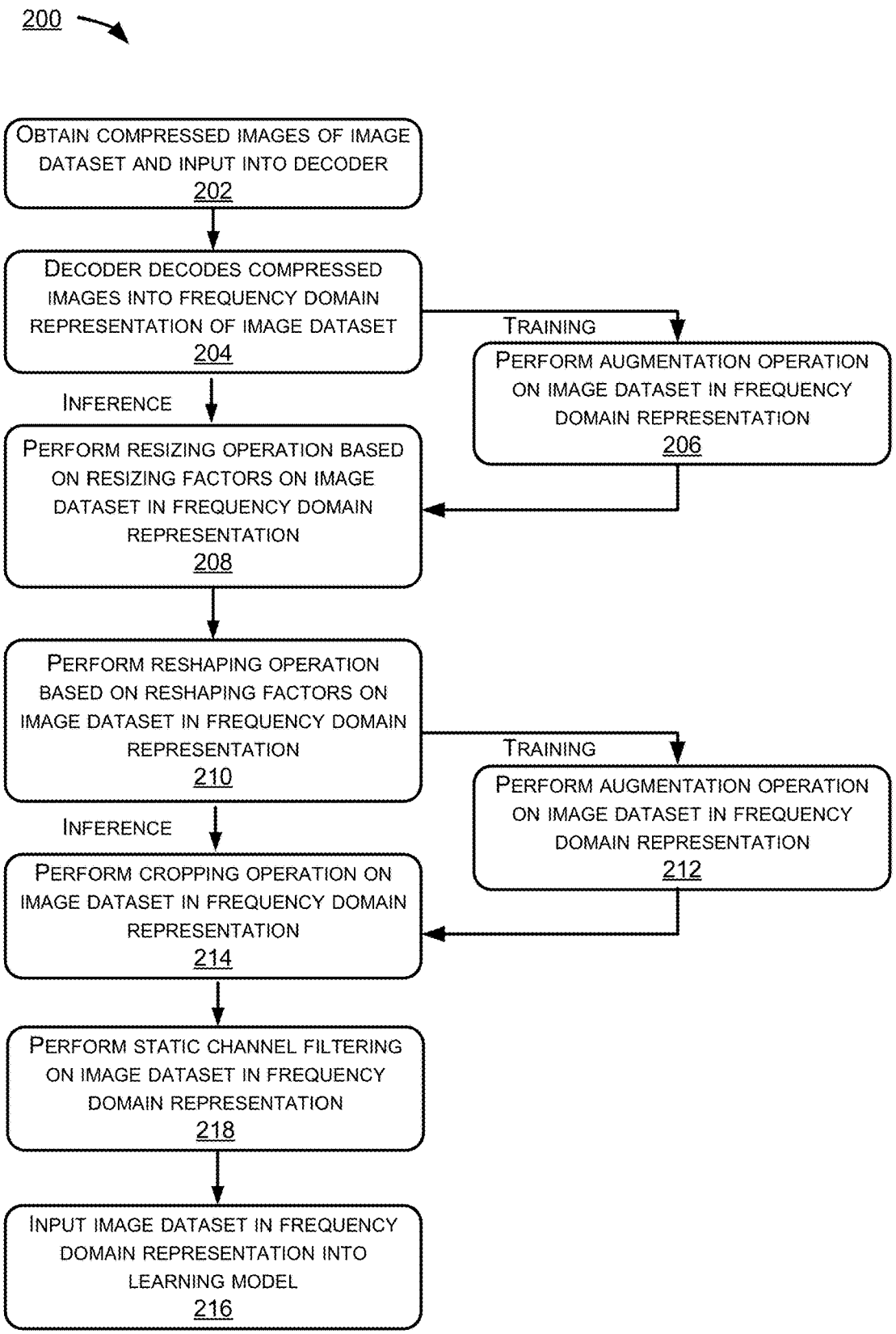

FIGS. 2A, 2B, and 2C illustrate flowcharts of a preprocessing and augmentation process 200 for image datasets to be input into a learning model for training and inference according to example embodiments of the present disclosure.

Prior to steps of the process 200, the images of the image dataset may have been captured by an image capture device in a raw image format. The image capture device may be, for example, a security camera or a camera of a smart vehicle. The image capture device may capture images making up an image dataset in the form of still images or video. The image capture device may further encode captured images into a compressed format by an encoding mode of a codec which transforms captured images into frequency domain representations thereof.

According to example embodiments of the present disclosure, image capture devices may be connected by a data bus connection, optical data connection, or other connection suitable for transmission of images with a computing device operative to perform image decoding, preprocessing and augmentation operations, or may be connected by a wired or wireless network connection with such a computing device. For example, a computing device may be a personal computing system, a cluster of computing systems, a server of a cloud computing system such as an edge server, an embedded computing system of a smart device such as a vehicle or appliance, and the like. Examples of computing devices according to example embodiments of the present disclosure may further be operative to perform subsequent training and inference computations using the image dataset, depending on respective computing capacity. In example embodiments of the present disclosure where a computing device is not operative to perform training and inference computations, the computing device may further be connected by suitable connections, such as wired or wireless network connections, to additional computing devices operative to perform training and inference computations. In any case, at least each step of the process 200 may be performed by a computing device as described herein.

Alternatively, according to other example embodiments of the present disclosure, images of image datasets may originate from one or more precompiled image datasets rather than raw images captured by an image capture device. According to such example embodiments, image datasets obtained in such manners may have already been encoded into a compressed format by a uniform codec, so as to facilitate subsequent steps of preprocessing and augmentation. These image datasets may be stored on various storage devices, such as non-volatile storage devices of computing devices according to example embodiments of the present disclosure, and computer-readable storage media in general as defined by the present disclosure.

In general, steps of the process 200 may be performed by general-purpose processor(s) 102 or by special-purpose processor(s) 104. It should be understood that at any point during the process 200, images of the image dataset may be transported from general-purpose processor(s) 102 to special-purpose processor(s) 104; those steps of the process 200 occurring before the transport may be performed by general-purpose processor(s) 102, and those steps of the process 200 occurring after the transport may be performed by special-purpose processor(s) 104. Therefore, for example, the transport may occur after step 204 and before step 206 (or, if step 206 does not occur, before step 208), such that steps 204 and earlier is performed by general-purpose processor(s) 102 and each step after step 204 is performed by special-purpose processor(s) 104. Alternatively, the transport may occur after step 210 and before step 212, At a step 202, compressed images of an image dataset are obtained and input into a decoder.

According to example embodiments of the present disclosure, the compressed images have already been transformed into a frequency domain representation by DCT, and have subsequently been encoded into a compressed format.

At a step 204, the decoder decodes the compressed images into a frequency domain representation of the image dataset.

For example, the decoder may apply entropy decoding and dequantization to the compressed images. However, the decoder does not apply IDCT to the compressed images to return the compressed images to spatial domain representations thereof. At this stage, decoded images in a frequency domain representation may be represented by DCT blocks (i.e., arrays of coefficients) and may have channel size n and dimensions height H and width W. Moreover, components of the image may be represented by separate DCT blocks. For example, according to implementation of the JPEG codec, prior to being transformed into a frequency-domain representation, images may be converted to representations thereof in the YCbCr color space, such that a luma component (Y) is separated from chroma components (Cb and Cr). Each of the luma component and the chroma components may be represented by a separate DCT block in the frequency domain.

At a step 206, an augmentation operation is performed on the image dataset in a frequency domain representation.

For conciseness, data augmentation operations are described in further detail below with reference to step 212. The augmented image dataset may be used for a training computation of a learning model. However, according to example embodiments of the present disclosure, a learning model may be assumed to require image datasets having uniform dimensions of height h and width w, and at this stage of the process 200, the augmented image dataset may not yet have these uniform dimensions across all images. Thus, according to example embodiments of the present disclosure, the augmented image dataset following step 206 may not yet be used for a training computation of a learning model. Alternatively, step 206 may be performed with only augmentation operations which do not affect dimensions of images of the image dataset. Alternatively, according to example embodiments of the present disclosure, step 206 may not be performed, and augmentation is instead performed after dimensions of the image dataset are modified by at least some of the subsequent preprocessing operations, such as described below with reference to step 212.

Augmentation of an image dataset may refer to any type of operation performed on data of the dataset images to generate additional images in the image dataset. For example, images may be resized, rotated, reshaped, cropped, rescaled in any or all color channels thereof, shifted by some number of pixels in any direction, altered in brightness or contrast, or flipped in any orientation, or may undergo other such operations as known to persons skilled in the art. Moreover, images may undergo operations only operative in frequency domain representations, such as having frequency jitter applied thereto. Thus, the image dataset following augmentation may contain some number of images derived from other images of the image dataset by any of the above-mentioned operations or combinations thereof, as well as any other suitable operations known to persons skilled in the art.

A training computation may generally be performed to train the learning model on a loss function to learn a feature embedding operative to compute one or more tasks. Tasks may include, for example, classification, clustering, matching, regression, and the like. The performance of such training computations is generally known to persons skilled in the art and need not be reiterated herein.

At a step 208, a resizing operation based on resizing factors is performed on the image dataset in a frequency domain representation.

According to example embodiments of the present disclosure, several preprocessing operations may be performed on the image dataset to result in each image of the image dataset having uniform dimensions of height h and width w smaller than the original height H and width W, as required by a learning model. One of these preprocessing operations may be a resizing operation as described herein. Another of these preprocessing operations may be a reshaping operation as described below with reference to step 210. Another of these preprocessing operations may be a cropping operation as described below with reference to step 214.

Images of the image dataset may be resized according to any known resizing algorithm applicable to image representations in the frequency domain, such as to DCT blocks. For example, a hybrid resizing algorithm ("HRA") may be applied. In general, a first DCT block of an image having dimensions of height H and width W may be resized to a second DCT block of the image having dimensions of height h=H×P/L and width w=W×Q/M. P/L and Q/M are the respective resizing factors for height and width of the image to be resized. P, Q, L, and M may each be an integer, and L and M may be predetermined values.

Since images are composed of DCT blocks, this may be accomplished by transforming each DCT block (i.e., an array of coefficients) from having dimensions $N_h \times N_w$ to having dimensions $K_h \times K_w$, where $N_h$ and $N_w$ are respectively the lengthwise and widthwise integer dimensions of the DCT blocks before the transformations and $K_h$ and $K_w$ are respectively the lengthwise and widthwise integer dimensions of the DCT blocks after the transformations. To be consistent with resizing factors of the overall image, the transformation should resample DCT blocks from having dimensions $LN_h \times MN_w$ to having dimensions $PN_h \times QN_w$, first padding the image on two adjacent sides or all four sides as necessary such that they are proportional to $LN_h \times MN_w$ (dimensions of known values).

Therefore, the DCT blocks are resampled by the resampling factors $r_h = H/(LN_h)$ heightwise and $r_w = W/(MN_w)$ widthwise, such that $r_h(LN_h)(P/L) = K_h$ and $r_w(MN_w)(Q/M) = K_w$. Thus, P is derived for an HRA computation as $P = K_h(N_h r_h)$ and $Q = K_w(N_w r_w)$.

Consequently, application of HRA to a first DCT block (n, H, W) having channel size n and dimensions height H and width W resizes the first DCT block to a second DCT block (n, H×P/L, W×Q/M) having channel size n and dimensions of height H×P/L and width W×Q/M.

At a step 210, a reshaping operation based on reshaping factors is performed on the image dataset in a frequency domain representation.

Since the images are represented in the frequency domain rather than the spatial domain, rather than preprocessing operations removing pixel information, preprocessing operations may not be readily applicable to frequency information if applied in a conventional manner to DCT blocks. For example, since the image may be composed of multiple DCT blocks each representing a component of the image (such as the Y, Cb, and Cr components), preprocessing each DCT block separately may fail to effectively preserve coherent image data. Thus, it is desirable to generate a single representation of an image while maintaining representation in the frequency domain.

Therefore, according to example embodiments of the present disclosure, to preprocess images represented in the frequency domain, images may be reshaped so that all image data of the same frequency in each component of the image is aggregated in a same channel. To accomplish this, a resized image (n, H×P/L, W×Q/M) may further be reshaped to a reshaped image (n×$N_h \times N_w$, H×P/L/$N_h$, W×Q/M/$N_w$) having channel size n×$N_h \times N_w$ and dimensions of height H×P/L/$N_h$ and width W×Q/M/$N_w$.

Consequently, the height and width of each image is reduced by a respective reshaping factor while the size of each channel is proportionally increased in two dimensions by the same reshaping factors, resulting in a rank 2 tensor of $N_h \times N_w$ matrices. The rank 2 tensors are then reduced to rank 1 tensors having the same number of channels but reduced dimensionality. The number of channels may be the same as the number of DCT coefficients per block.

Next, the reduced-dimensionality tensors may be aggregated by frequency to produce an aggregated rank 2 tensor, each channel of the aggregated rank 2 tensor containing all image data of the same frequency. The number of channels of the aggregated tensor may be equal to the number of coefficients in the original DCT blocks. This reshaping enables the subsequent cropping step 114 to be performed across frequency channels of the image consistently for each of the Y, Cb, and Cr components.

At a step 212, an augmentation operation is performed on the image dataset in a frequency domain representation.

Augmentation operations according to example embodiments of the present disclosure may be performed by reshaping an image representation in the frequency domain from a H×W image to a three-dimensional tensor of dimensions (H/N)×(W/N)×(N×N).

An augmentation operation according to example embodiments of the present disclosure may be a flip operation, which may be performed upon the tensor in a manner similar to that performed for image representations in the spatial domain, wherein values in the tensor may be mirrored across an axis to generate a new tensor of the same dimensions.

An augmentation operation according to example embodiments of the present disclosure may be a rotation operation, which may be performed upon the tensor in a manner similar to that performed for image representations in the spatial domain, wherein values in the tensor may be rotated into any suitable orientation to generate a new tensor of the same dimensions.

An augmentation operation according to example embodiments of the present disclosure may be a crop operation (at random locations, any number of times), which may be performed upon the tensor in a manner similar to that performed for image representations in the spatial domain, wherein values in the tensor may be cropped to any suitable subset to generate a new tensor of smaller dimensions.

An augmentation operation according to example embodiments of the present disclosure may be a noise injection operation, which may be performed upon the tensor in a manner similar to color jitter as performed for image representations in the spatial domain, wherein a random value is added to each value of the tensor to generate a new tensor of the same dimensions.

An augmentation operation according to example embodiments of the present disclosure may be a channel reweighting operation, which may be performed upon an image representation in the spatial domain by multiplying a coefficient of each channel by a weighing factor. A weighing factor may be scaled from 0 to 1, inclusive, or may be scaled from 0 to values larger than 1. Weighing factors may be determined for various purposes wherein certain resolutions of the image should be emphasized and/or deemphasized: for example, in the case that images of the image dataset are compressed in JPEG format, and a quality factor set for the JPEG encoder is known, frequencies emphasized and deemphasized in the compressed images may be determined based on the quality factor. Therefore, weighing factors may be set to weigh frequencies favored by the quality factor more highly than frequencies disfavored by the quality factor.

Other augmentation operations according to example embodiments of the present disclosure may be any operation on an image representation in the frequency domain, or a tensor thereof, which generates an arbitrary new image or tensor, respectively, derived from the original image or tensor data.

Presently, the augmented image dataset may be used for a training computation of a learning model.

At a step 214, a cropping operation is performed on the image dataset in a frequency domain representation.

Images of the image dataset, having undergone reshaping, may now be directly cropped to the dimensions h×w as required for input into the learning model. According to example embodiments of the present disclosure, the location of the crop may be determined as follows.

In the case that, during step 208, the image was padded on all four sides, the cropping operation may be a center crop performed on all four sides of the image.

In the case that, during step 208, the image was padded at a lower right portion, the cropping operation may be a corner crop performed on upper and left edges of the image.

At a step 216, the image dataset in a frequency domain representation is input into a learning model.

The image dataset may be input into a learning model to be utilized for training or inference computations, without the image dataset having undergone IDCT to be returned to a spatial domain representation. As described below, example embodiments of the present disclosure may enable the input to connect directly to a layer deeper than the first layer. Machine learning inference computations as known to persons skilled in the art may be more efficiently performed having an image dataset in a frequency domain representation.

In addition to the above-mentioned steps, at a step 218, a static channel filtering operation is performed on the image dataset in a frequency domain representation.

It should be appreciated that while the placement of step 218 in the process 200 on FIG. 2A illustrates one possible timing for the performance of step 218 relative to other steps of the process 200, the performance of step 218 during the process 200 may occur at any position relative to the other steps of the process 200, including before each step of the process 200 after decoding the image dataset (i.e., after step 204) as illustrated by FIG. 2B, and after each step of the process 200 before inputting the image dataset into a learning model (i.e., after each step except step 216) as illustrated by FIG. 2C.

Generally, each step of the process 200 may be performed at general-purpose processor(s) 102 or at special-purpose processor(s) 104. Furthermore, generally, each step of the process 200 performed at special-purpose processor(s) 104 may be performed later than all steps of the process 200 performed at general-purpose processor(s) 102, due to the need to transport the image dataset from general-purpose processor(s) 102 to special-purpose processor(s) 104 by the system bus 108 or the data bus 110 before any of the steps performed at special-purpose processor(s) 104 may be performed.

Thus, according to example embodiments of the present disclosure, step 218 may be performed after each other step of the process 200 performed at general-purpose processor(s) 102, and before each other step of the process 200 performed at special-purpose processor(s) 104. For example, in the case that steps 208 and 210 are performed at general-purpose processor(s) 102 and at least step 212 is performed at special-purpose processor(s) 104, step 218 may be performed between steps 210 and 212 and before the image dataset is transported to special-purpose processor(s) 104. In the case that steps 208, 210, and 212 are performed at general-purpose processor(s) 102 and at least step 214 is performed at special-purpose processor(s) 104, step 218 may be performed between steps 212 and 214 and before the image dataset is transported to special-purpose processor(s) 104. In the case that steps 208, 210, 212, and 214 are performed at general-purpose processor(s) 102, step 218 may be performed after step 214 and before the image dataset is transported to special-purpose processor(s) 104. In all cases, performing step 218 before the image dataset is transported to special-purpose processor(s) 104 may achieve the above-mentioned objective of reducing volume of image data to be transported, in manners as described below.

A static channel filtering operation according to example embodiments of the present disclosure may refer to an operation performed upon image data represented in the frequency domain. In particular, image data represented in the frequency domain, as described above, may be represented by DCT blocks (i.e., arrays of coefficients) having channel size n and dimensions height H and width W. For example, according to one common implementation of DCT, a DCT block has dimensions of 8×8.

Based on implementation of various codecs, image data represented in the frequency domain may be representations of the original image in various color spaces. For example, based on the implementation of the JPEG codec, image data represented in the frequency domain may be a representation of the original image in the YCbCr color space. Moreover, each of the Y (luma) component and the Cb and Cr (chroma) components has a separate spatial domain representation and, thus, may have a separate frequency domain representation as a DCT block. (The luma component and the chroma components of an image may alternately be referred to as the luma channel and the chroma channels of the image; for clarity in the context of the present disclosure, which refers to "channels" of other kinds, they shall be referred to as the luma component and the chroma components herein.)

Based on implementation of various codecs, coefficients in a DCT block may be organized in order of increasing frequency from an upper-left corner of the DCT block to a lower-right corner of the DCT block. According to example embodiments of the present disclosure, image data may be represented in the frequency domain by three DCT blocks of dimensions 8×8 each, containing 64 channels each, and totaling 192 channels for an image. A set of three DCT blocks may, for example, be a representation of a Y component of an image, a representation of a Cb component of an and a representation of a Cr component of an image, respectively.

A static channel filtering operation may be performed on a set of three DCT blocks as described above. A static channel filtering operation may be defined by discarding values of particular coefficients of each of the three DCT blocks, where the coefficients whose values are discarded are predetermined according to criteria tailored to model training and inference computations as described herein. Any number of the 192 channels of the three DCT blocks may have their coefficient values discarded. Discarding a coefficient value may mean, for example, setting the coefficient value to 0 or otherwise minimizing bit length of the coefficient value, so as to reduce volume of image data represented by the three DCT blocks.

Learning models performing training and inference computations according to example embodiments of the present disclosure may require certain frequency channels of image data as represented in the frequency domain to be input into the learning model, or, in those training and inference computations, may emphasize certain frequency channels of image data as represented in the frequency domain. Conversely, other channels that are not required or not emphasized may not be necessary for the training and inference computations.

For example, in frequency domain representations of common photographic images, the lowest-frequency channels are expected to have higher coefficient values than higher-frequency channels, and higher-frequency channels are expected to have lower coefficient values. This correlates to a general understanding that discarding coefficient values of higher-frequency channels from an image minimally impacts perception of the image by human viewers, and, accordingly, an expectation that discarding coefficient values of higher-frequency channels from the image also may minimally impact training and inference computations utilizing the image by a learning model. In accordance, lower-frequency channels from the image dataset may be emphasized.

Alternatively, based on a general understanding that edges and fine details in an image correspond to higher-frequency channels in an image, in the event that a learning model is to perform training and inference computations based on edges and fine details in image datasets, higher-frequency channels from the image dataset may be emphasized.

Thus, learning models according to example embodiments of the present disclosure may have a first layer requiring or emphasizing certain frequency channels of image data as represented in the frequency domain. A first layer of a learning model may, for example, be an input layer of a neural network. An input layer may receive values of input image datasets (such as DCT block coefficients according to example embodiments of the present disclosure) and, without performing computations upon the values, pass those values over connections to a second layer. Second and later layers of a neural network generally perform training and computation inferences as described herein. The connections from the first layer to the second layer may be weighted, thereby implementing requiring or emphasizing certain frequency channels of image data as represented in the frequency domain by up-weighting coefficient values of certain frequency channels and down-weighting coefficient values of other certain frequency channels. Out of all coefficient values of frequency channels, some number will most likely be down-weighted to be negligible, on the grounds that they are not expected to contribute greatly to training and inference computations.

Consequently, according to example embodiments of the present disclosure, performance of static channel filtering upon an image dataset represented in the frequency domain may cause coefficient values that would have been down-weighted by connections from a first layer to a second layer of a learning model to be instead discarded. Thus, designation of those particular frequency channels wherein coefficient values are to be discarded in static channel filtering may be performed based on knowledge of the learning model design including, for example, knowledge of weighting of connections from a first layer to a second layer of the learning model. Alternatively, the first layer of the learning model may be designed based on the static channel filtering, such that the first layer takes fewer coefficient values as input, disregarding coefficient values known to have been discarded during static channel filtering.

Moreover, in the case that the image data represented in the frequency domain may be a representation of the original image in the YCbCr color space, designation of numbers of frequency channels wherein coefficient values are to be kept in static channel filtering may be performed based on chroma subsampling rates. As implemented in codecs such as the JPEG codec, chroma subsampling provides various ratios by which image data in the chroma components is kept to a smaller proportion relative to image data in the luma components. As chroma subsampling reflects a general understanding that discarding image data in the chroma components impacts perception of the image by human viewers less than discarding a same proportion of image data in the luma component, by these ratios, static channel filtering may also designate a higher proportion of frequency channels of the luma components to be kept than frequency channels of the luma components (though chroma subsampling rates refer to ratios of pixels, according to example embodiments of the present disclosure we apply alike ratios to frequency channels).

For example, based on the chroma subsampling rate 4:1:1, the static channel filter may keep four frequency channels for the Y component for each frequency channel kept for the Cb component and each frequency channel kept for the Cr component. Thus, for example, static channel filtering may be performed discarding all but 16 frequency channels of the Y component (such as, for example, the 16 lowest-frequency channels, the 16 highest-frequency channels, or 16 frequency channels chosen by other criteria); all but 4 frequency channels of the Cb component (such as, for example, the 4 lowest-frequency channels, the 4 highest-frequency channels, or 4 frequency channels chosen by other criteria); and all but 4 frequency channels of the Cr component (such as, for example, the 4 lowest-frequency channels, the 4 highest-frequency channels, or 4 frequency channels chosen by other criteria). Thus, by way of example, 168 frequency channels may be discarded from the luma component and the chroma components, leaving 24 frequency channels between the Y, Cb, and Cr components. It should also be understood that the number of channels kept need not be 24; for example, maintaining the above ratio of 4:1:1, the number of channels kept may be 6, 12, 18, and the like.

For example, based on the chroma subsampling rate 4:2:2, the static channel filter may keep four frequency channels for the Y component for every two frequency channel kept for the Cb component and every two frequency channel kept for the Cr component. Thus, for example, static channel filtering may be performed discarding all but 12 frequency channels of the Y component (such as, for example, the 12 lowest-frequency channels, the 12 highest-frequency channels, or 12 particular channels chosen by other criteria); all but 6 frequency channels of the Cb component (such as, for example, the 6 lowest-frequency channels, the 6 highest-frequency channels, or 6 particular channels chosen by other criteria); and all but 6 frequency channels of the Cr component (such as, for example, the 6 lowest-frequency channels, the 6 highest-frequency channels, or 6 particular channels chosen by other criteria).

Additionally, among those channels wherein image data is kept, static channel filtering may further apply weights to statically determined channels, down-weighting certain channels and/or up-weighting certain channels, also based on various principles as described above.

FIGS. 3A, 3B, and 3C illustrate static channel filtering performed on a DCT block according to example embodiments of the present disclosure. FIG. 3A illustrates discarding all but the lowest-frequency channels of a DCT block. FIG. 3B illustrates discarding all but the highest-frequency channels of a DCT block. FIG. 3C illustrates discarding all but some particular channels of the DCT block chosen by other criteria.

Figure 3D:
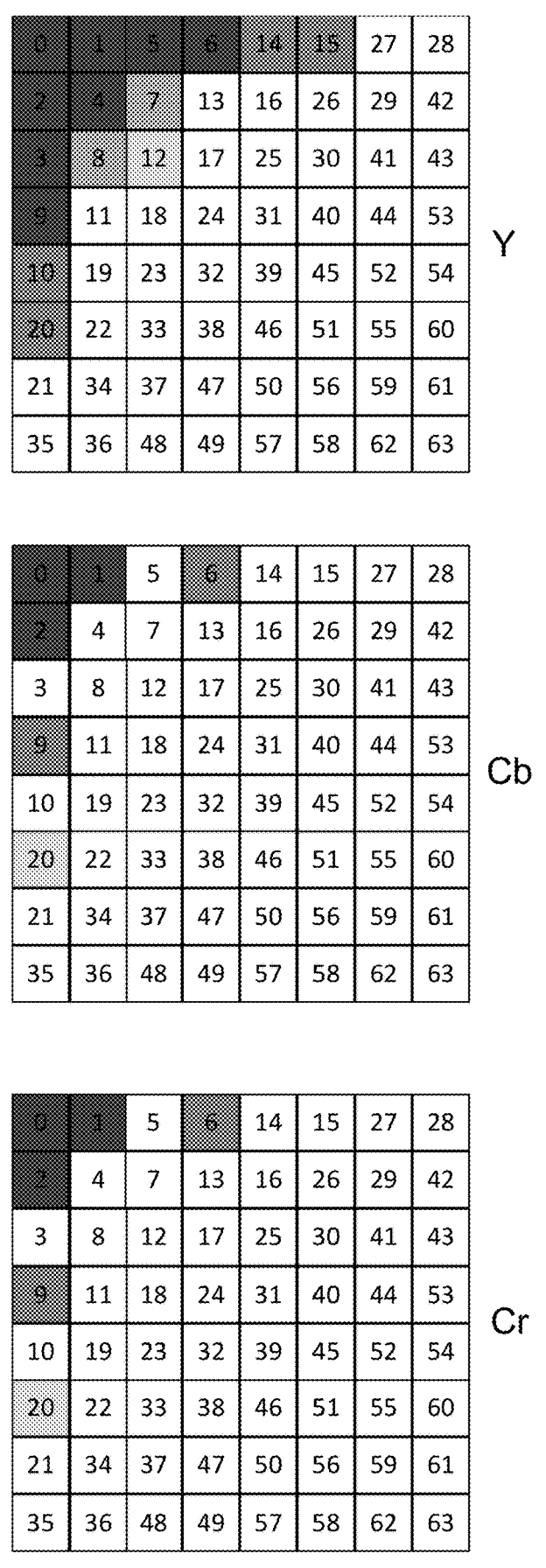
Figure 3E:
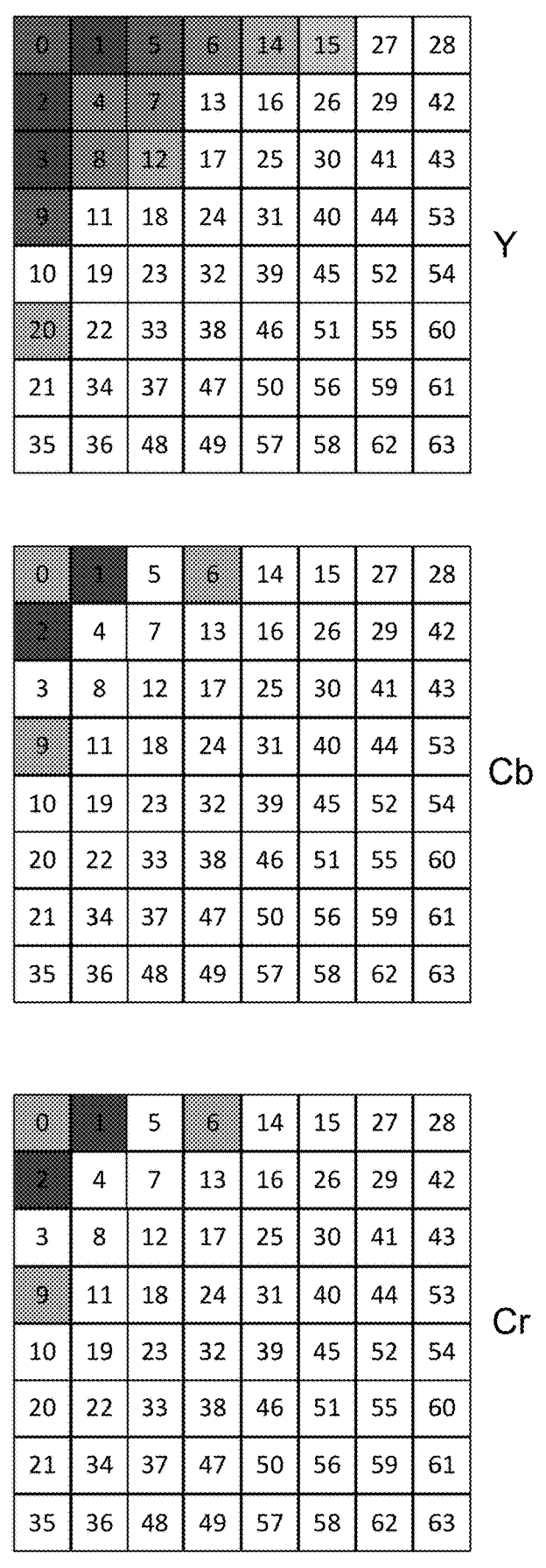
Figure 3F:
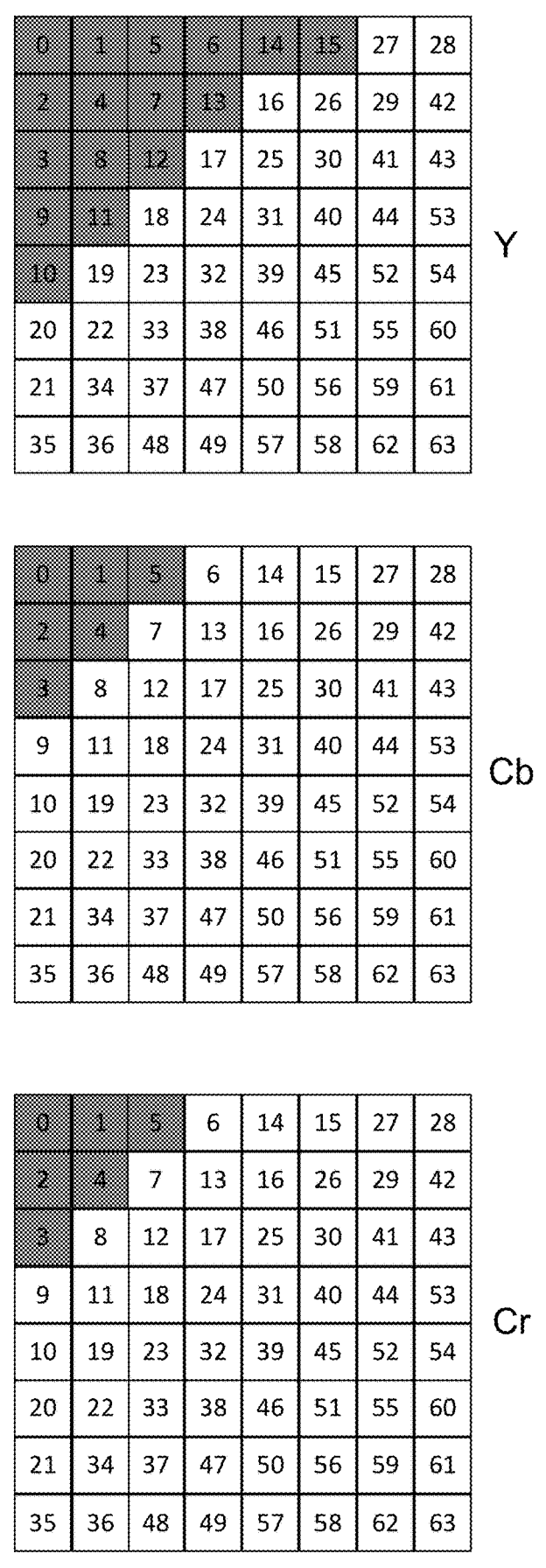

FIGS. 3D, 3E, and 3F illustrate examples of static channel filtering discarding all but the lowest-frequency channels of one each of Y, Cb, and Cr DCT blocks and further applying weights to channels wherein image data is kept. In contrast to FIGS. 3A, 3B, and 3C wherein numbers illustrated in each box represent coefficients, in FIGS. 3D, 3E, and 3F numbers illustrated in each box merely represent a static identifier of each channel. For example, the lowest-frequency channels of a DCT block may be identified as those channels numbered from 0 up to 15 in FIGS. 3D and 3E, occupying an upper left corner of the DCT block (as illustrated in FIG. 3F, these channels may occupy a triangle-shaped region of the DCT block). In FIGS. 3D and 3E, shading of each box represents experimentally determined probability that each corresponding channel is significant to training and inference computing for certain purposes, where darkest-shaded boxes represent probability of 1 or near 1, and lightest-shaded boxes represent probability near 0. In FIG. 3F, a static selection of channels for a static channel filter is illustrated highlighted (darkness of shading having no significance in FIG. 3F).

As described above, the number of channels kept may be determined based on ratios of chroma subsampling rates. For example, the numbers of channels kept in the Y, Cb, and Cr DCT blocks may be proportional to the ratios as described above. Alternatively, the numbers of channels kept according to their respective weights may be proportional to the ratios as described above.

Moreover, as described above, in some example embodiments of the present disclosure, before step 218 is performed, at least steps 210 and 212 are performed; that is, the height and width of each image of the image dataset is reduced by a reshaping factor while the size of each channel is proportionally increased by the same reshaping factor. Each DCT block is reduced to one channel, causing frequency to be uniform across DCT blocks of the same image, each of 64 channels having one coefficient. Thus, static channel filtering performed after steps 210 and 212 may discard coefficient values of channels of an aggregate tensor, rather than coefficient values of a DCT block.

Moreover, as described above, in some example embodiments of the present disclosure, before step 218 is performed, at least step 214 is performed; that is, at least some channels of an aggregate tensor representing the image in the frequency domain are removed by cropping. Thus, static channel filtering performed after step 214 may need to discard fewer coefficient values of an aggregate tensor or of a DCT block than static channel filtering performed before step 214, due to some channels being removed by cropping.

Thus, as a result of performance of static channel filtering upon an image dataset represented in the frequency domain, a first layer which passes input coefficient values over weighted connections to a second layer may be bypassed as a consequence, allowing step 216 to be performed by inputting directly into a layer, such as the second layer, deeper than the first layer. Thus, whereas the first layer is conventionally an input layer, the second layer may herein be an input layer. Alternatively, the first layer may be reduced in size based on the coefficient values discarded during static channel filtering, so that the first layer does not take inputs for coefficient values that have been discarded. In either case, discarded coefficient values need not be downweighted, thus reducing computational overhead and time of machine learning training and inference computations, reducing volume of image data input into the learning model, and reducing convergence time for the learning model.

Figure 4:
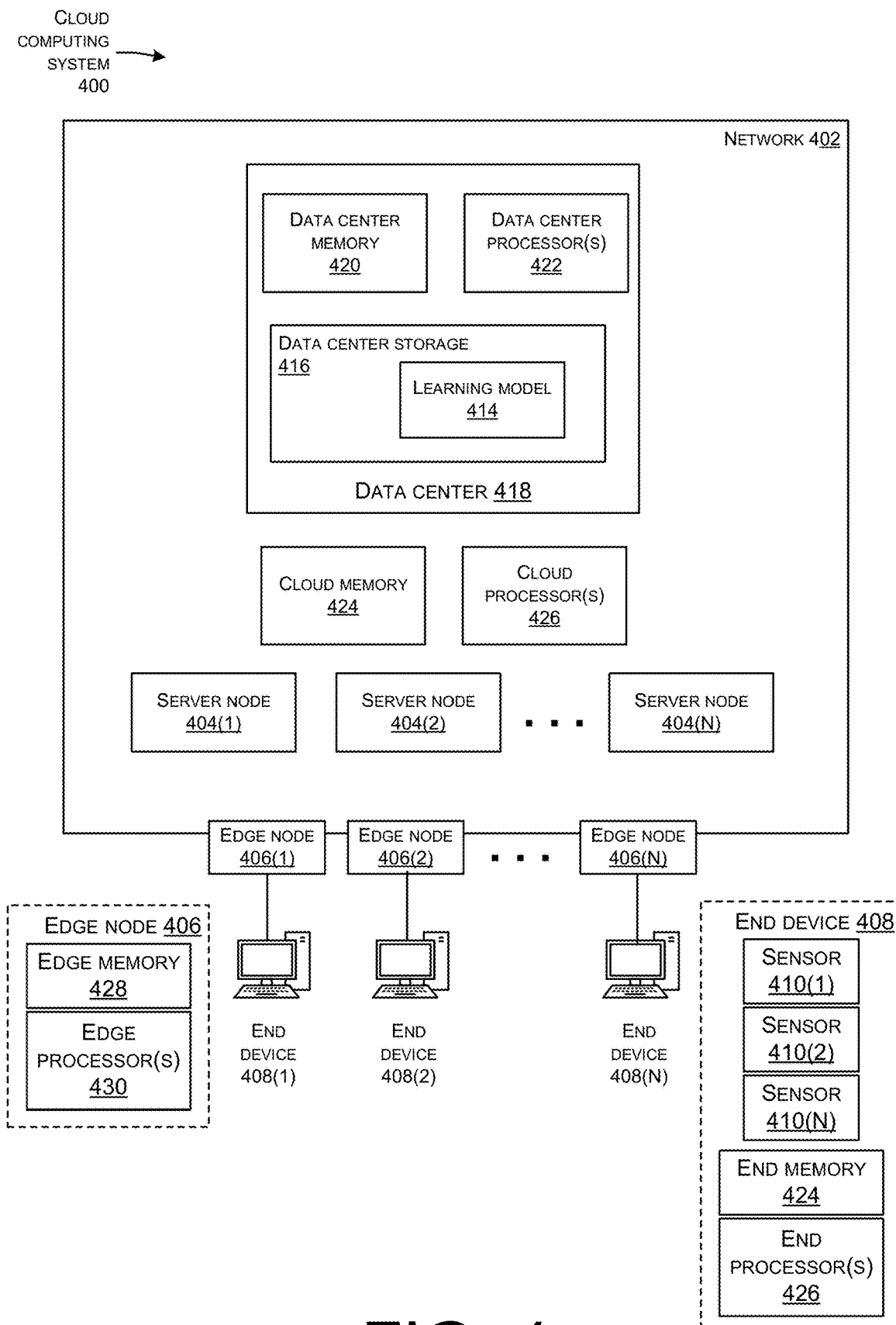
FIG. 4 illustrates an architectural diagram of a cloud computing system hosting a learning model according to example embodiments of the present disclosure.

FIG. 4 illustrates an architectural diagram of a cloud computing system 400 hosting a learning model according to example embodiments of the present disclosure. As described above, while examples of computing devices according to example embodiments of the present disclosure may be operative to perform subsequent training and inference computations using the image dataset, in other cases additional computing devices, in communication by network connections, may be operative to perform training and inference computations. Thus, this figure illustrates some possible architectural embodiments of computing devices as described above.

The cloud computing system 400 may be implemented over a network 402 of physical or virtual server nodes 404(1), 404(2), . . . , 404(N) (where any unspecified server node may be referred to as a server node 404) connected by physical or virtual network connections. Furthermore, the network 402 terminates at physical or virtual edge nodes 406(1), 406(2), . . . , 406(N) (where any unspecified edge node may be referred to as an edge node 406) located at physical and/or logical edges of the network 402. The edge nodes 406(1) to 406(N) may connect to any number of end devices 408(1), 408(2), . . . , 408(N) (where any unspecified end device may be referred to as an end device 408). An end device 408, such as, by way of example, end device 408(1), may collect captured data from any number of sensors 410(1), 410(2), . . . , 410(N), where a sensor may be, for example, an image capture device operative to collect image data (such as still images, video frames, and the like).

A learning model 414 implemented on the cloud computing system 400 may be stored on physical or virtual storage 416 of a data center 418 ("data center storage"), and may be loaded into physical or virtual memory 420 of the data center 418 ("data center memory") in order for one or more physical or virtual processor(s) 422 of the data center 418 ("data center processor(s)") to perform training and/or inference computations using the learning model 414 to compute input datasets related to neural network computing tasks. Data center processor(s) 422 may be special-purpose computing devices facilitating computation of neural network computing tasks. For example, data center processor(s) 422 may be one or more special-purpose processor(s) 104 as described above, including accelerator(s) such as Neural Network Processing Units ("NPUs"), Graphics Processing Units ("GPUs"), Tensor Processing Units ("TPU"), and the like.

According to example embodiments of the present disclosure, a computing device as described above may be any of the server nodes 404, any of the edge nodes 406, or any of the end devices 408, and image datasets captured at an end device 408 may be loaded into physical or virtual memory 424 of the end devices 408 ("end memory") in order for one or more physical or virtual processor(s) 426 ("end processor(s)") of the end devices 408 to perform encoding, preprocessing and/or augmentation operations as described above. Alternatively, image datasets captured at an end device 408 may be transported to any of the edge nodes 406 and loaded into physical or virtual memory 428 of the edge nodes 406 ("edge memory") in order for one or more physical or virtual processor(s) 430 of the edge nodes 406 ("edge processor(s)") to perform encoding, preprocessing and/or augmentation operations as described above. Alternatively, image datasets captured at an end device 408 may be transported to any of the server nodes 404 and loaded into physical or virtual memory 424 of the cloud computing system 400 ("cloud memory") in order for one or more physical or virtual processor(s) 426 of the cloud computing system 400 ("cloud processor(s)") to perform encoding, preprocessing and/or augmentation operations as described above. Alternatively, rather than being captured, image datasets may originate from one or more precompiled image datasets, and to not need to be compressed as long as they are compressed in a uniform format. In general, if images of image datasets are captured and compressed according to example embodiments of the present disclosure, they may be compressed at any of the end devices 408 rather than other devices, so as to minimize data transported.

Image datasets that have been preprocessed and/or augmented according to embodiments of the present disclosure may be transported to one or more server nodes 404 and utilized by the cloud computing network 400 to perform training and/or inference computations based on the learning model 414. Generally, training and inference computations may be intensive in consumption of computational resources. Thus, it is desirable to reduce computation where possible, by, for example, bypassing a first layer of a learning model when inputting image datasets as described above with reference to FIGS. 2A, 2B, and 2C, by avoiding the redundant operations of transforming decoded image data into a spatial domain representation prior to input into the learning model. By performing preprocessing and augmentation operations in the frequency domain and then inputting the preprocessed and augmented image dataset into a learning model without the decoder performing IDCT on the image dataset, example embodiments of the present disclosure may accomplish such objectives.

Figure 5:
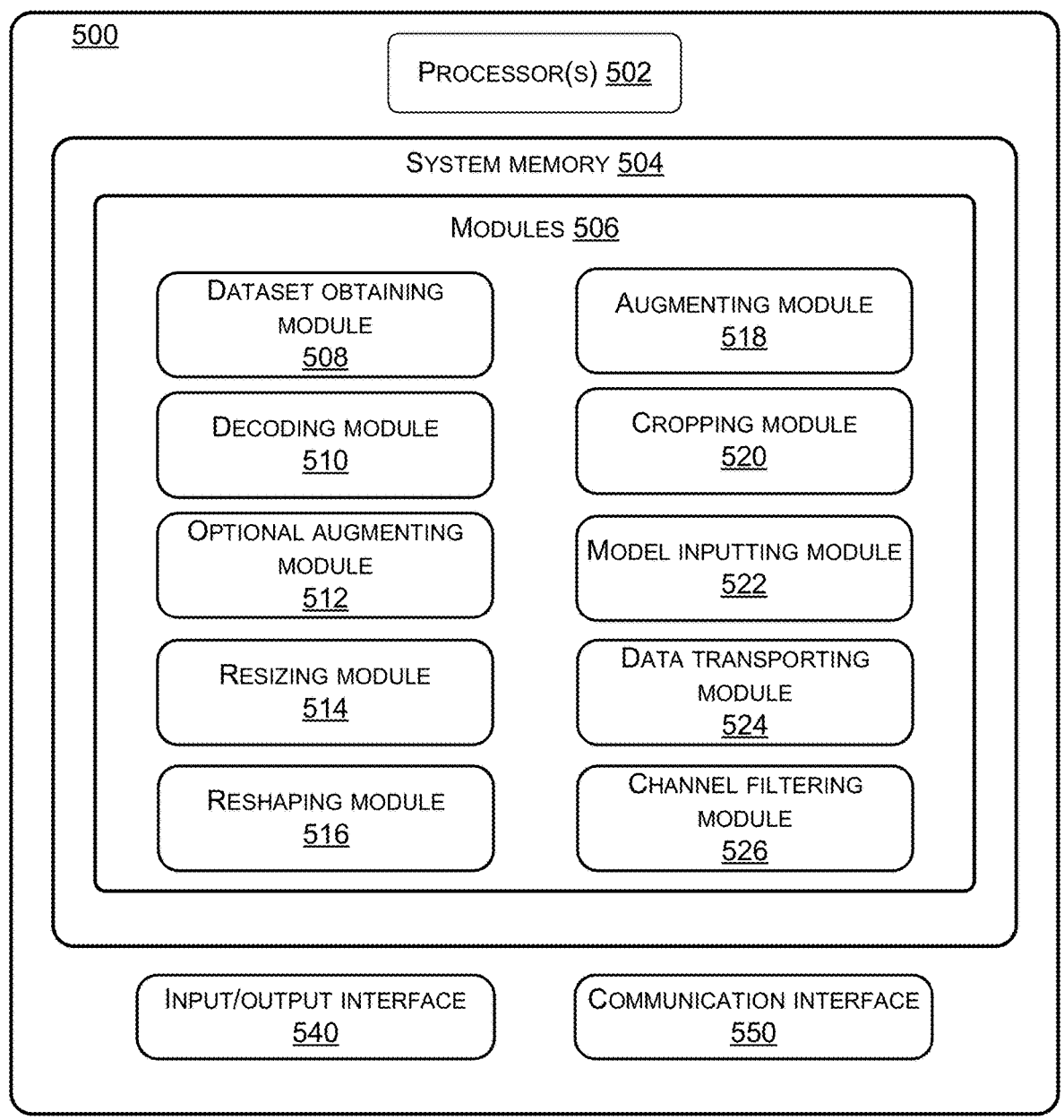
FIG. 5 illustrates an example system for implementing the processes and methods described herein for implementing static channel filtering in the frequency domain for learning models.

FIG. 5 illustrates an example system 500 for implementing the processes and methods described above for implementing static channel filtering in the frequency domain for learning models.

The techniques and mechanisms described herein may be implemented by multiple instances of the system 500, as well as by any other computing device, system, and/or environment. The system 500 may be a distributed system composed of multiple physically networked computers or web servers, a physical or virtual cluster, a computing cloud, or other networked computing architectures providing physical or virtual computing resources as known by persons skilled in the art. Examples thereof include learning systems such as the cloud computing system as described above with reference to FIG. 4. The system 500 shown in FIG. 5 is only one example of a system and is not intended to suggest any limitation as to the scope of use or functionality of any computing device utilized to perform the processes and/or procedures described above. Other well-known computing devices, systems, environments and/or configurations that may be suitable for use with the embodiments include, but are not limited to, personal computers, server computers, hand-held or laptop devices, multiprocessor systems, microprocessor-based systems, set top boxes, game consoles, programmable consumer electronics, network PCs, minicomputers, mainframe computers, distributed computing environments that include any of the above systems or devices, implementations using field programmable gate arrays ("FPGAs") and application specific integrated circuits ("ASICs"), and/or the like.

The system 500 may include one or more processors 502 and system memory 504 communicatively coupled to the processor(s) 502. The processor(s) 502 and system memory 504 may be physical or may be virtualized and/or distributed. The processor(s) 502 may execute one or more modules and/or processes to cause the processor(s) 502 to perform a variety of functions. In embodiments, the processor(s) 502 may include a central processing unit ("CPU"), a GPU, an NPU, a TPU, any combinations thereof, or other processing units or components known in the art. Additionally, each of the processor(s) 502 may possess its own local memory, which also may store program modules, program data, and/or one or more operating systems.

Depending on the exact configuration and type of the system 500, the system memory 504 may be volatile, such as RAM, non-volatile, such as ROM, flash memory, miniature hard drive, memory card, and the like, or some combination thereof. The system memory 504 may include one or more computer-executable modules 506 that are executable by the processor(s) 502. The modules 506 may be hosted on a network as services for a data processing platform, which may be implemented on a separate system from the system 500.

The modules 506 may include, but are not limited to, a dataset obtaining module 508, a decoding module 510, an optional augmenting module 512, a resizing module 514, a reshaping module 516, an augmenting module 518, a cropping module 520, a model inputting module 522, a data transporting module 524, and a channel filtering module 526.

The dataset obtaining module 508 may be configured to obtain compressed images of an image dataset and input the images into a decoder as described above with reference to FIGS. 2A, 2B, and 2C.

The decoding module 510 may be configured to decode the compressed images into a frequency domain representation of the image dataset as described above with reference to FIGS. 2A, 2B, and 2C.

The optional augmenting module 512 may be configured to perform an augmentation operation on the image dataset in a frequency domain representation before subsequently described modules perform preprocessing operations, as described above optionally with reference to FIGS. 2A, 2B, and 2C.

The resizing module 514 may be configured to perform a resizing operation based on resizing factors on the image dataset in a frequency domain representation as described above with reference to FIGS. 2A, 2B, and 2C.

The reshaping module 516 may be configured to perform a reshaping operation based on reshaping factors is performed on the image dataset in a frequency domain representation, as described above with reference to FIGS. 2A, 2B, and 2C.

The augmenting module 518 may be configured to perform an augmentation operation on the image dataset in a frequency domain representation before subsequently described modules perform preprocessing operations, as described above optionally with reference to FIGS. 2A, 2B, and 2C.

The cropping module 520 may be configured to perform a cropping operation on the image dataset in a frequency domain representation, as described above with reference to FIGS. 2A, 2B, and 2C.

The model inputting module 522 may be configured to input the image dataset in a frequency domain representation into a learning model, as described above with reference to FIGS. 2A, 2B, and 2C.

The data transporting module 524 may be configured to transport the image dataset in a frequency domain representation to one or more special-purpose processor(s), as described above with reference to FIG. 1.

The channel filtering module 526 may be configured to perform a static channel filtering operation on the image dataset in a frequency domain representation, as described above with reference to FIGS. 3A, 3B, and 3C.

The system 500 may additionally include an input/output ("I/O") interface 540 and a communication module 550 allowing the system 500 to communicate with other systems and devices over a network, such as edge nodes and end devices as described above. The network may include the Internet, wired media such as a wired network or direct-wired connections, and wireless media such as acoustic, radio frequency ("RF"), infrared, and other wireless media.

Some or all operations of the methods described above can be performed by execution of computer-readable instructions stored on a computer-readable storage medium, as defined below. The term "computer-readable instructions" as used in the description and claims, include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

The computer-readable storage media may include volatile memory (such as random-access memory ("RAM")) and/or non-volatile memory (such as read-only memory ("ROM"), flash memory, etc.). The computer-readable storage media may also include additional removable storage and/or non-removable storage including, but not limited to, flash memory, magnetic storage, optical storage, and/or tape storage that may provide non-volatile storage of computer-readable instructions, data structures, program modules, and the like.

A non-transient computer-readable storage medium is an example of computer-readable media. Computer-readable media includes at least two types of computer-readable media, namely computer-readable storage media and communications media. Computer-readable storage media includes volatile and non-volatile, removable and non-removable media implemented in any process or technology for storage of information such as computer-readable instructions, data structures, program modules, or other data. Computer-readable storage media includes, but is not limited to, phase change memory ("PRAM"), static random-access memory ("SRAM"), dynamic random-access memory ("DRAM"), other types of random-access memory ("RANI"), read-only memory ("ROM"), electrically erasable programmable read-only memory ("EEPROM"), flash memory or other memory technology, compact disk read-only memory ("CD-ROM"), digital versatile disks ("DVD") or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism. As defined herein, computer-readable storage media do not include communication media.

The computer-readable instructions stored on one or more non-transitory computer-readable storage media that, when executed by one or more processors, may perform operations described above with reference to FIGS. 1-5. Generally, computer-readable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

By the abovementioned technical solutions, the present disclosure provides static channel filtering upon image datasets transformed to frequency domain representations, so that volumes of image data transported over system buses and data buses to special-purpose processor(s) may be reduced. In static channel filtering, designation of those particular frequency channels wherein coefficient values are to be discarded in static channel filtering may be performed based on knowledge of the learning model design including, for example, knowledge of weighting of connections from a first layer to a second layer of the learning model. Alternatively, the first layer of the learning model may be designed based on the static channel filtering, such that the first layer takes fewer coefficient values as input, disregarding coefficient values known to have been discarded during static channel filtering. Performing static channel filtering upon image datasets at any point before they are transported to special-purpose processor(s) may enable a filtered image dataset to be input to a second layer of a learning model, bypassing a first layer, or may enable a learning model to be designed with a reduced-size first layer. This may achieve benefits such as reducing computational overhead and time of machine learning training and inference computations, reducing volume of image data input into the learning model, and reducing convergence time for the learning model.

EXAMPLE CLAUSES

A. A method comprising: decoding images of an image dataset to generate a frequency domain representation of the image dataset; discarding coefficient values of one or more particular frequency channels of each image of the image dataset in a frequency domain representation; and transporting the image dataset in a frequency domain representation to one or more special-purpose processor(s).

B. The method as paragraph A recites, wherein the frequency channels of which coefficient values are discarded comprise one of: highest-frequency channels of each DCT block of each image or lowest-frequency channels of each DCT block of each image.

C. The method as paragraph A recites, wherein the frequency channels of which coefficient values are discarded comprise arbitrary frequency channels of each DCT block of each image.

D. The method as paragraph A recites, wherein the frequency channels of which coefficient values are discarded comprise one of: highest-frequency channels of an aggregate tensor generated by a resizing operation and a reshaping operation performed on each image or lowest-frequency channels of the aggregate tensor.

E. The method as paragraph A recites, wherein the frequency channels of which coefficient values are discarded comprise arbitrary frequency channels of an aggregate tensor generated by a resizing operation and a reshaping operation performed on the image.

F. The method as paragraph A recites, wherein the frequency channels of which coefficient values are discarded comprise more channels of chroma components of each image than channels of luma components of each image.

G. The method as paragraph A recites, wherein the coefficient values of the one or more frequency channels are discarded on each image of the image dataset before a resizing operation, a reshaping operation, and a cropping operation are performed on the image.

H. The method as paragraph A recites, wherein the coefficient values of the one or more frequency channels are discarded on each image of the image dataset at least after a resizing operation and a reshaping operation are performed on the image.

I. The method as paragraph H recites, wherein the coefficient values of the one or more frequency channels are discarded on each image of the image dataset further after a cropping operation are performed on the image.

J. The method as paragraph A recites, further comprising inputting the image dataset into a layer of a learning model deeper than a first layer of the learning model.

K. The method as paragraph A recites, further comprising inputting the image dataset into a first layer of a learning model which does not take as inputs the frequency channels of which coefficient values are discarded.

L. A system comprising: one or more processors; and memory communicatively coupled to the one or more processors, the memory storing computer-executable modules executable by the one or more processors that, when executed by the one or more processors, perform associated operations, the computer-executable modules comprising: a decoding module configured to decode images of an image dataset to generate a frequency domain representation of the image dataset; a channel filtering module configured to discard coefficient values of one or more particular frequency channels of each image of the image dataset in a frequency domain representation; and a data transporting module configured to transport the image dataset in a frequency domain representation to one or more special-purpose processor(s).

M. The system as paragraph L recites, wherein the channel filtering module is configured to discard coefficient values of frequency channels comprising one of: highest-frequency channels of each DCT block of each image or lowest-frequency channels of each DCT block of each image.

N. The system as paragraph L recites, wherein the channel filtering module is configured to discard coefficient values of frequency channels comprising arbitrary frequency channels of each DCT block of each image.

O. The system as paragraph L recites, wherein the channel filtering module is configured to discard coefficient values of frequency channels comprising one of: highest-frequency channels of an aggregate tensor generated by a resizing operation and a reshaping operation performed on each image or lowest-frequency channels of the aggregate sensor.

P. The system as paragraph L recites, wherein the channel filtering module is configured to discard coefficient values of frequency channels comprising arbitrary frequency channels of an aggregate tensor generated by a resizing operation and a reshaping operation performed on the image.

Q. The system as paragraph L recites, wherein the channel filtering module is configured to discard coefficient values of frequency channels comprising more channels of chroma components of each image than channels of luma components of each image.

R. The system as paragraph L recites, wherein the channel filtering module is configured to discard coefficient values of the one or more frequency channels of each image of the image dataset before a resizing module performs a resizing operation, a reshaping module performs a reshaping operation, and a cropping module performs a cropping operation on the image.

S. The system as paragraph L recites, wherein the channel filtering module is configured to discard coefficient values of the one or more frequency channels of each image of the image dataset after at least a resizing module performs a resizing operation and a reshaping module performs a reshaping operation on the image.

T. The system as paragraph S recites, wherein the channel filtering module is configured to discard coefficient values of the one or more frequency channels of each image of the image dataset further after a cropping module performs a cropping operation on the image.

U. The system as paragraph L recites, further comprising a model inputting module configured to input the image dataset into a layer of a learning model deeper than a first layer of the learning model.

V. The system as paragraph L recites, further comprising a model inputting module configured to input the image dataset into a first layer of a learning model which does not take as inputs the frequency channels of which coefficient values are discarded.

W. A computer-readable storage medium storing computer-readable instructions executable by one or more processors, that when executed by the one or more processors, cause the one or more processors to perform operations comprising: decoding images of an image dataset to generate a frequency domain representation of the image dataset; discarding coefficient values of one or more particular frequency channels of each image of the image dataset in a frequency domain representation; and transporting the image dataset in a frequency domain representation to one or more special-purpose processor(s).

X. The computer-readable storage medium as paragraph W recites, wherein the frequency channels of which coefficient values are discarded comprise one of: highest-frequency channels of each DCT block of each image or lowest-frequency channels of each DCT block of each image.

Y. The computer-readable storage medium as paragraph W recites, wherein the frequency channels of which coefficient values are discarded comprise arbitrary frequency channels of each DCT block of each image.

Z. The computer-readable storage medium as paragraph W recites, wherein the frequency channels of which coefficient values are discarded comprise one of: highest-frequency channels of an aggregate tensor generated by a resizing operation and a reshaping operation performed on each image or lowest-frequency channels of the aggregate tensor.

AA. The computer-readable storage medium as paragraph W recites, wherein the frequency channels of which coefficient values are discarded comprise arbitrary frequency channels of an aggregate tensor generated by a resizing operation and a reshaping operation performed on the image.

BB. The computer-readable storage medium as paragraph W recites, wherein the frequency channels of which coefficient values are discarded comprise more channels of chroma components of each image than channels of luma components of each image.

CC. The computer-readable storage medium as paragraph W recites, wherein the coefficient values of the one or more frequency channels are discarded on each image of the image dataset before a resizing operation, a reshaping operation, and a cropping operation are performed on the image.

DD. The computer-readable storage medium as paragraph W recites, wherein the coefficient values of the one or more frequency channels are discarded on each image of the image dataset at least after a resizing operation and a reshaping operation are performed on the image.

EE. The computer-readable storage medium as paragraph DD recites, wherein the coefficient values of the one or more frequency channels are discarded on each image of the image dataset further after a cropping operation are performed on the image.

FF. The computer-readable storage medium as paragraph W recites, wherein the operations further comprise inputting the image dataset into a layer of a learning model deeper than a first layer of the learning model.

GG. The computer-readable storage medium as paragraph W recites, wherein the operations further comprise inputting the image dataset into a first layer of a learning model which does not take as inputs the frequency channels of which coefficient values are discarded.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method comprising:
   decoding images of an image dataset to generate a frequency domain representation of the image dataset;
   discarding coefficient values of one or more particular frequency channels of each image of the image dataset in a frequency domain representation, the discarded coefficient values comprising coefficient values of some, but not all, frequency channels of chroma components and coefficient values of at least some channels of luma components; and
   transporting the image dataset in a frequency domain representation to one or more special-purpose processor(s).

2. The method of claim 1, wherein the frequency channels of which coefficient values are discarded comprise one of: highest-frequency channels of each DCT block of each image or lowest-frequency channels of each DCT block of each image.

3. The method of claim 1, wherein the frequency channels of which coefficient values are discarded comprise more channels of chroma components of each image than channels of luma components of each image.

4. The method of claim 1, wherein the coefficient values of the one or more frequency channels are discarded on each image of the image dataset before a resizing operation, a reshaping operation, and a cropping operation are performed on the image.

5. The method of claim 1, wherein the coefficient values of the one or more frequency channels are discarded on each image of the image dataset after a resizing operation and a reshaping operation are performed on the image and before a cropping operation is performed on the image.

6. The method of claim 1, further comprising inputting the image dataset into a layer of a learning model deeper than a first layer of the learning model.

7. The method of claim 1, further comprising inputting the image dataset into a first layer of a learning model which does not take as inputs the frequency channels of which coefficient values are discarded.

8. A system comprising:
   one or more processors; and
   memory communicatively coupled to the one or more processors, the memory storing computer-executable modules executable by the one or more processors that, when executed by the one or more processors, perform associated operations, the computer-executable modules comprising:
      a decoding module configured to decode images of an image dataset to generate a frequency domain representation of the image dataset;
      a channel filtering module configured to discard coefficient values of one or more particular frequency channels of each image of the image dataset in a frequency domain representation, the discarded coefficient values comprising coefficient values of some, but not all, frequency channels of chroma components and coefficient values of at least some channels of luma components; and
      a data transporting module configured to transport the image dataset in a frequency domain representation to one or more special-purpose processor(s).

9. The system of claim 8, wherein the channel filtering module is configured to discard coefficient values of frequency channels comprising one of: highest-frequency channels of each DCT block of each image or lowest-frequency channels of each DCT block of each image.

10. The system of claim 8, wherein the channel filtering module is configured to discard coefficient values of frequency channels comprising more channels of chroma components of each image than channels of luma components of each image.

11. The system of claim 8, wherein the channel filtering module is configured to discard coefficient values of the one or more frequency channels of each image of the image dataset before a resizing module performs a resizing operation, a reshaping module performs a reshaping operation, and a cropping module performs a cropping operation on the image.

12. The system of claim 8, wherein the channel filtering module is configured to discard coefficient values of the one or more frequency channels of each image of the image dataset after at least a resizing module performs a resizing operation and a reshaping module performs a reshaping operation on the image.

13. The system of claim 8, further comprising a model inputting module configured to input the image dataset into a layer of a learning model deeper than a first layer of the learning model.

14. The system of claim 8, further comprising a model inputting module configured to input the image dataset into a first layer of a learning model which does not take as inputs the frequency channels of which coefficient are discarded.

15. A computer-readable storage medium storing computer-readable instructions executable by one or more processors, that when executed by the one or more processors, cause the one or more processors to perform operations comprising:
   decoding images of an image dataset to generate a frequency domain representation of the image dataset;
   discarding coefficient values of one or more particular frequency channels of each image of the image dataset in a frequency domain representation, the discarded coefficient values comprising coefficient values of some, but not all, frequency channels of chroma components and coefficient values of at least some channels of luma components; and
   transporting the image dataset in a frequency domain representation to one or more special-purpose processor(s).

16. The computer-readable storage medium of claim 15, wherein the frequency channels of which coefficient values are discarded comprise one of: highest-frequency channels of each DCT block of each image or lowest-frequency channels of each DCT block of each image.

17. The computer-readable storage medium of claim 15, wherein the frequency channels of which coefficient values are discarded comprise more channels of chroma components of each image than channels of luma components of each image.

18. The computer-readable storage medium of claim 15, wherein the coefficient values of the one or more frequency channels are discarded on each image of the image dataset at least after a resizing operation and a reshaping operation are performed on the image.

19. The computer-readable storage medium of claim 15, wherein the operations further comprise inputting the image dataset into a layer of a learning model deeper than a first layer of the learning model.

20. The computer-readable storage medium of claim 15, wherein the operations further comprise inputting the image dataset into a first layer of a learning model which does not take as inputs the frequency channels of which coefficient values are discarded.

* * * * *